(12) United States Patent
McBride

(10) Patent No.: US 8,795,521 B1
(45) Date of Patent: Aug. 5, 2014

(54) FILTER APPARATUS

(75) Inventor: Dale McBride, Bakersfield, CA (US)

(73) Assignee: Akers Process Systems Inc., Houston, TX (US)

( * ) Notice: Subject to any disclaimer, the term of this patent is extended or adjusted under 35 U.S.C. 154(b) by 118 days.

(21) Appl. No.: 12/848,974

(22) Filed: Aug. 2, 2010

Related U.S. Application Data

(60) Provisional application No. 61/273,484, filed on Aug. 4, 2009.

(51) Int. Cl.
*B01D 24/14* (2006.01)
*B01D 24/46* (2006.01)

(52) U.S. Cl.
USPC ............ 210/189; 210/280; 210/289; 210/291

(58) Field of Classification Search
USPC ................. 210/189, 269, 289, 291, 293, 792, 210/433.1, 451, 280
See application file for complete search history.

(56) References Cited

U.S. PATENT DOCUMENTS

| | | | |
|---|---|---|---|
| 1,843,242 A * | 2/1932 | Rafton | 210/409 |
| 2,136,660 A | 11/1938 | Martin | |
| 2,880,874 A * | 4/1959 | Ferrara | 210/272 |
| 3,557,955 A | 1/1971 | Hirs | |
| 3,557,961 A | 1/1971 | Stuart | |
| 3,737,039 A | 6/1973 | Hirs | |
| 3,757,954 A | 9/1973 | Toth | |
| 3,780,861 A | 12/1973 | Hirs | |
| 3,794,179 A * | 2/1974 | Doucet | 210/409 |
| 3,812,969 A | 5/1974 | Maroney | |
| 4,246,102 A | 1/1981 | Hjelmner et al. | |
| 4,320,004 A | 3/1982 | Schecter | |
| 4,496,464 A | 1/1985 | Hensley | |
| 4,787,987 A | 11/1988 | Hensley | |
| 4,826,609 A | 5/1989 | Hensley | |
| 4,966,698 A | 10/1990 | Hensley | |
| 5,114,595 A | 5/1992 | Hensley | |
| 5,171,443 A | 12/1992 | Bratten | |
| 5,290,458 A | 3/1994 | Bratten | |
| 5,407,574 A | 4/1995 | Hensley | |
| 5,635,080 A | 6/1997 | Hensley | |
| 6,790,357 B2 * | 9/2004 | Norell | 210/345 |

* cited by examiner

*Primary Examiner* — Matthew O Savage
(74) *Attorney, Agent, or Firm* — James M. Duncan, Esq.; Klein DeNatale Goldner

(57) ABSTRACT

A nut shell filter allows the shell filter media to be scrubbed without being removed from the filter vessel. In order to protect the vessel from pressure surges which can occur during the scrubbing cycle, pressure applied during the beginning of the scrubbing cycle is contained within a scrubber tube such that the filter vessel is not subjected to pressure surges which occur at the beginning of the scrubbing cycle. The scrubber tube and scrubber filter tube may either be disposed within the filter vessel or outside of the filter vessel.

15 Claims, 8 Drawing Sheets

FILTER APPARATUS

CROSS-REFERENCE TO RELATED APPLICATION

U.S. Provisional Application No. 61/273,484 for this invention was filed on Aug. 4, 2009 for which application this inventor claims domestic priority.

BACKGROUND OF THE INVENTION

The present invention generally relates to the removal of contaminants or debris from a flowing liquid stream. The present invention more specifically relates to various embodiments of an apparatus which employs a filter media comprised of particulate filter matter in which the filter media may be backwashed to clean the captured contaminants from the filter media.

Removal of contaminants or debris from a flowing liquid stream by the employment of a filter media comprised of particulate filter material is known. Various prior U.S. patents teach the advantages of using various different sizes of various different particulate filter material. Many of the described filter systems require that the filter media be removed from the filter vessel each time it becomes necessary to scrub the contaminant from the media, thereby enabling the media to be used many times.

As stated in U.S. Pat. No. 4,496,464 (the "'464 patent") these prior art systems require a considerable amount of additional space, and complicated plumbing must be connected between the various pumps, valves, and other mechanical members in order to interconnect the scrubbing vessel and filtering vessel so that various different predetermined flow patterns are attained. A substantial amount of equipment is required in order to return the filter media to the filter vessel. In addition to the added cost and the required additional space considerations, all of the external plumbing presents a continued maintenance problem; and, the numerous additional mechanical connections involved therein greatly increase the likelihood of leakage occurring from the different components of the filter system.

The '464 patent, which is incorporated herein in its entirety by this reference, provides additional explanation of the problems associated with filter systems which required transfer of the filter media from the filter vessel into a scrubber vessel. In an effort to solve these problems, the '464 patent discloses a filter system wherein the filter media remains within the filter vessel for the entire life of the media, and wherein the filter media is scrubbed or rejuvenated without removing the filter media to a second vessel.

One drawback of the apparatus disclosed in the '464 patent is that the entire interior of the separator vessel is continually subjected to higher pressure during the scrubbing cycle imposed by the scrubbing pump. As noted in the example described in the '464 patent, the initial pressure drop across the filter media may change from a low of 3-5 psi to a pressure drop of 15-25 psi 18 hours later, at which time the scrubbing cycle is initiated. During the scrubbing cycle, the pressure at the discharge nozzle must be sufficiently high to force the liquid into a guide means and to the bottom of the vessel, setting up a flow pattern in which the filter media is "intimately admixed with the liquid contained in the vessel" such that the flow follows a geometrical flow path which is in the form of a toroid having a central vortex which coincides with the axial centerline of the vessel. Achieving this flow pattern requires the repeated application of pressures during the scrubbing mode which are typically higher than the pressures to which the vessel is exposed during the filtering mode. As stated above, for the example provided in the '464 patent, this cycle is repeated approximately every 18 hours, such that the vessel is subjected to a continual stress cycle in which the maximum pressure may substantially exceed the normal operating pressure of the vessel during the filtering cycle. In addition, during the scrubbing cycle, the interior scrubber of the '464 patent is subjected to exterior forces for which the interior scrubber must be designed to resist collapse.

It should be further noted that the apparatus disclosed in the '464 patent has screens at the bottom of the vessel through which the filtered liquid is discharged to an outlet header. It should be appreciated that the lower screens can be subjected to very high loads. If the backwash pump comes on while the separator vessel is already at a relatively high pressure, the vessel pressure can increase by 25 psi or more. The lower screens are thus subjected to the increased pressure, as well as the hydrostatic pressure of the fluid in the separator vessel and the media bed overlying the lower screens. Therefore, when the backwash pump comes on, the lower screens can be exposed to relatively high transient loads, which have, with the prior art designs, resulted in catastrophic damage to the lower screens.

SUMMARY OF THE INVENTION

The embodiments of the apparatus disclosed herein provide a solution to the problems identified above. The apparatus comprises a vessel within which there is enclosed a filter media comprised of particles of particulate filter material. Lateral screens are positioned at the lower end of the vessel and below most of the filter media, where the lateral screens comprise a screened surface for retaining the filter media within the vessel, and each lateral screen member is connected to a clean water outlet for discharge of the filtered water. The lateral screens of the present invention, because of the rectangular construction of the screens having a solid side wall, have additional structural strength. The upper end of the vessel provides a liquid and scrubbing space, with there being a contaminated water inlet, whereby flow of dirty or contaminated water is conducted into the upper end of the vessel, proceeds down through the filter media, where the filter media removes the contaminants from the flowing liquid, whereupon the clean water flows through the screened surface of the lateral supports, through the outlet, and away from the vessel, leaving the contaminants and filter media within the vessel.

From time to time, as the removed contaminants progressively accumulate within the filter media, it is necessary to scrub the filter media, thereby re-establishing the original filter efficiency. The scrubbing of the media is accomplished by introducing the backwash liquid into the vessel through a backwash filter tube, with the scrub liquid flowing through the inside diameter of the backwash filter tube and exiting through a nozzle disposed at the bottom of the tube. The nozzle comprises an orifice which may be utilized to control backpressure and to reduce the pressure to which the separator is subjected during the backwash cycle, particularly high transient pressures which occur when the backwash pump initially comes on. The backwash filter tube is enclosed within a scrubber tube. The scrubber tube and enclosed backwash filter tube may either be enclosed within the filter vessel, or attached to the outside of the vessel.

During the first phase of the backwash cycle, the scrubbing liquid flows through the nozzle at the bottom of the backwash filter tube, through an opening in the scrubber tube, and into the media bed located beneath the scrubber tube, causing great agitation of the media, to thereby translocate the removed contaminants from the media into the scrubbing liquid. It should be noted that during the backwash cycle, as opposed to the interior scrubber of the '464 patent which is subjected to exterior pressure and must resist collapse, the backwash filter tube of the present invention is subjected to internal pressure and must resist burst as opposed to collapse. As appreciated by those skilled in the art, a tube has greater resistance to burst pressure than to collapse pressure, such that flow of the backwash liquid on the inside of the backwash filter screen is preferred to flow on the outside.

During the second phase of the backwash cycle, the contaminated scrubbing liquid is discharged through the screen openings of the backwash filter tube, into the annular space of the scrubber tube and discharged through an outlet on the side of the scrubber and discharged from the scrubber. Also during this second phase, relatively clean make-up water may be added to the filter vessel.

Following the two phases of the backwash cycle, the filter media is reset or repositioned into the lower end of the vessel by shutting down all systems which causes the media to gravitate to the bottom. Thereafter, the various flow lines are cleaned by flowing filtered liquid from the vessel, along a closed circuit, and back into the vessel, thereby separating any residual contaminants from the liquid. The filter system is placed back on stream and used until the contaminant load on the media again increases to a magnitude which justifies undertaking another cleaning cycle.

BRIEF DESCRIPTION OF THE DRAWINGS

FIG. 9A shows a sectional view of the nozzle taken along line A-A of FIG. 9.

DETAILED DESCRIPTION OF THE EMBODIMENTS

Figure 1:
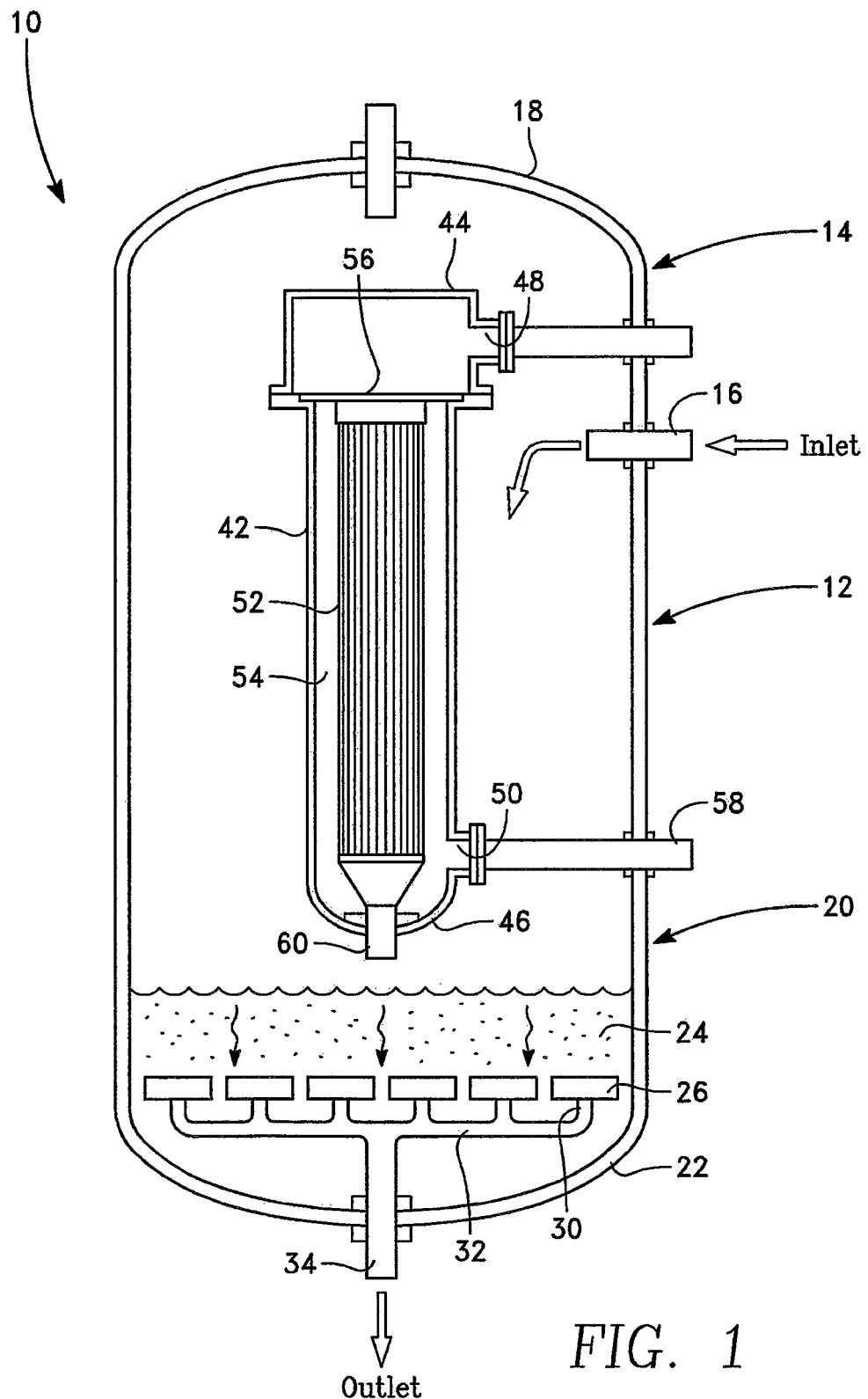
FIG. 1 depicts an embodiment of the disclosed filter system in the filtering mode.
Figure 2:
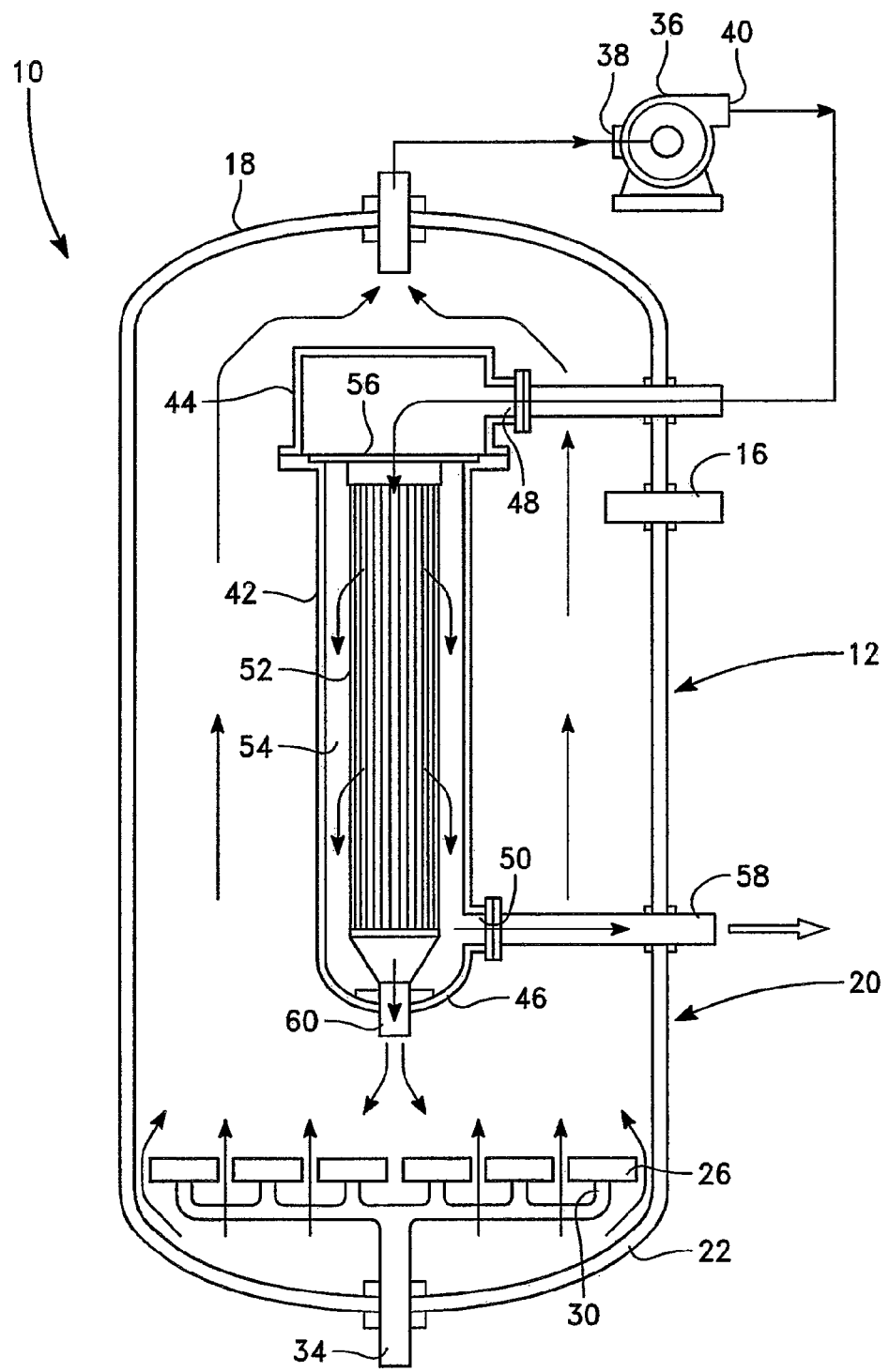
FIG. 2 depicts an embodiment of the disclosed filter system in the scrubbing cycle

Referring now to the figures, FIG. 1 shows an embodiment of the disclosed filtering system 10. The system comprises a filter vessel 12. The filter vessel 12 has an upper end 14, which generally extends from inlet 16 to the enclosed top 18 of the vessel. Contaminated liquid flows into the filter vessel 12 through inlet 16. The filter vessel 12 has a lower end 20 which generally comprises about the lower axial third of the vessel to the enclosed bottom 22 of the vessel. The filter vessel 12 is adapted to hold a quantity of particulate filter material 24. The filter material 24 may comprise various nutshell or other organic materials, including walnut shells, pecan shells, coconut shells, peach pits, apricot pits, and olive seeds. Acceptable filter material should be sufficiently strong as to resist rupture but also have a sufficiently high elastic modulus to resist deformation and to recover its size and shape after deformation. The filter material 24 will preferably have a depth of about four feet within filter vessel 12.

Figure 7:
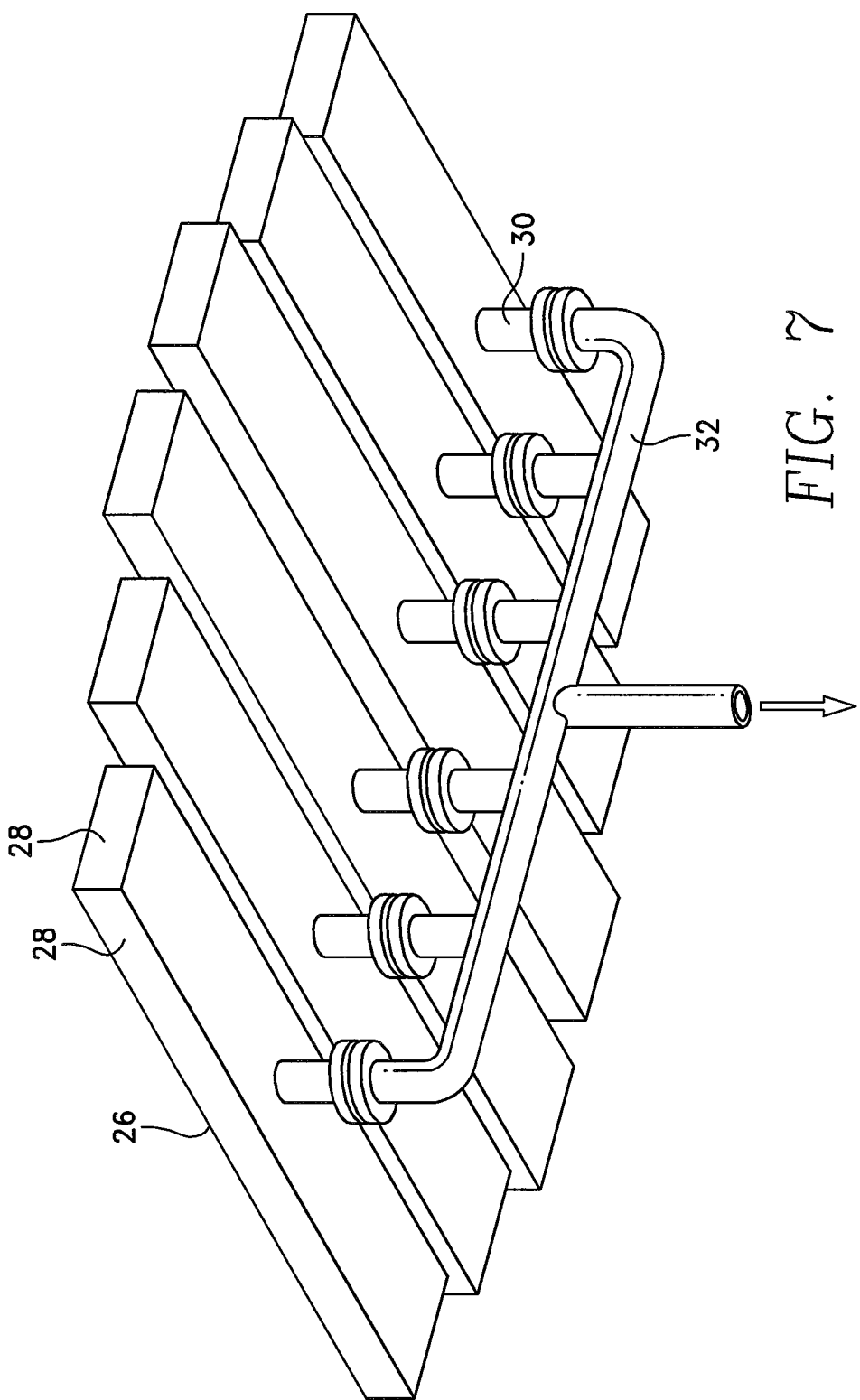
FIG. 7 shows a bottom oblique view of the lateral screens shown in FIG. 6, showing a configuration of discharge piping which may be utilized with the lateral screens.
Figure 8A:
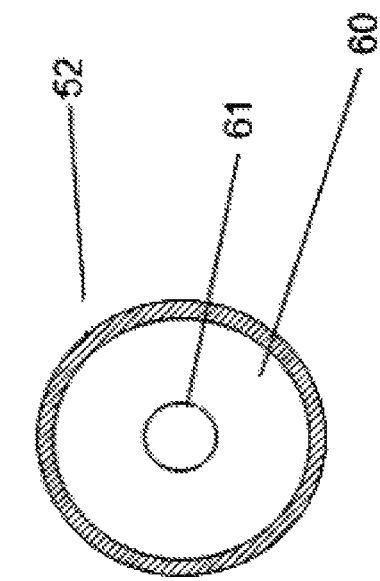
FIG. 8A shows a sectional view of the nozzle taken along line A-A of FIG. 8.
Figure 8:
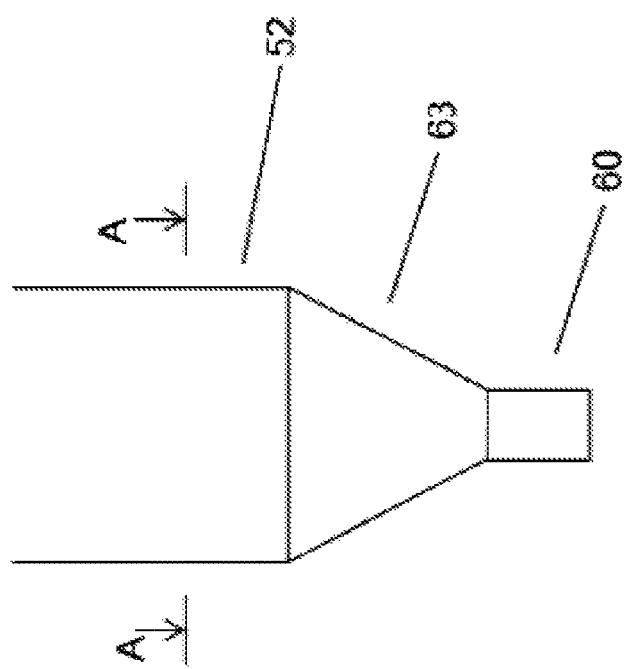
FIG. 8 shows a close up view of an embodiment of the nozzle of the scrubber tube.
Figure 9:
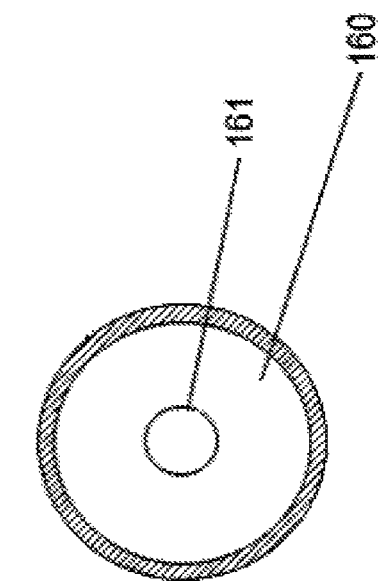
FIG. 9 shows a close up view of an embodiment of the nozzle of the scrubber tube.
Figure 9:
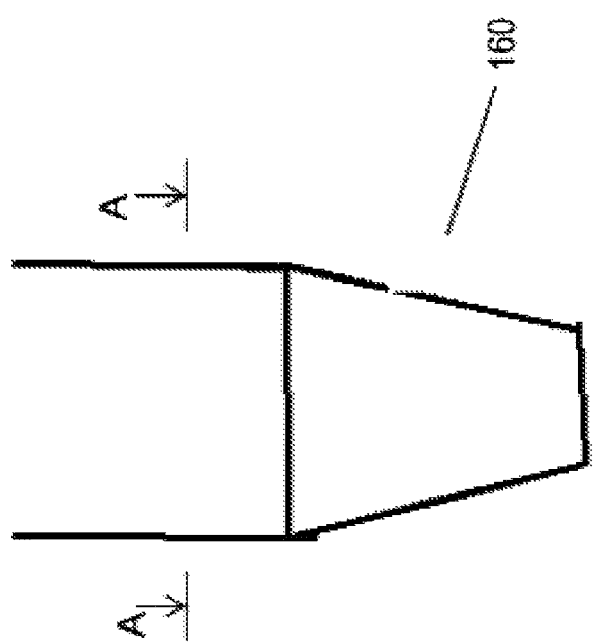

The disclosed filtering system 10 has at least one lateral screened enclosure 26 supported within the lower end 20 of the vessel 12. The lateral screened enclosure 26 may have rigid side walls 28 to provide additional structural strength. As shown in the Figures, the disclosed filtering system may have a plurality of lateral screen enclosures which are placed within the vessel at the lower end 20 at approximately the same axial position within the vessel 12. Each lateral screened enclosure 26 may comprise an outlet 30 through which filtered liquid can exit the enclosure into a header 32. Outlets 30 may be piped together, as shown in detail in FIG. 7, to header 32 for discharge out of vessel 12 through vessel outlet 34.

While other type of screening materials may be utilized, the top of lateral screen enclosure 26 is preferably of wedge wire construction, while the sides and bottoms may be fabricated from solid plate to provide additional structural strength to the screen enclosures. Wedge wire screens are superior for retaining media, filtering, and sizing. In comparison with wire mesh and perforated metal, wedge wire continuous slot screens have more open area, have very precise openings, are stronger and more durable, are virtually non-clogging and reduce media abrasion. The screen material utilized on lateral screen enclosure 26 should be corrosion resistant, and fabricated from corrosion resistant alloys such as type 304, 316, 316L, 321, and 410S stainless steels, or from nickel alloys. The slot widths of the screen material should be sized smaller than the particle size of the filter material 24 and are preferably 15 thousands of an inch.

The disclosed apparatus further comprises a scrubber apparatus connected to vessel 12. The scrubber apparatus provides the means for cleaning the filter material 24 to remove the matter deposited by the water passing through the filter material. The scrubber apparatus comprises some form of pump means, such as pump 36, which provides for circulation of scrub water through the vessel, allowing for the cleaning of the filter material 24. Pump 36 has a suction 38 and a discharge 40. The scrubber apparatus further comprises a scrubber tube 42 which has an enclosed top 44 and an enclosed bottom 46. Scrubber tube 42 is generally a cylindrical in shape. Scrubber tube 42 has an inlet 48 generally located at the top of the scrubber tube, where flow from the pump discharge 40 is received. Toward the bottom end of the scrubber tube 42 is an outlet 50 through which flow is discharged from the scrubber tube.

The scrubber apparatus further comprises a filter tube 52 which is contained within the scrubber tube 42. An annulus 54 is defined between the scrubber tube 42 and the filter tube 52. As with the scrubber tube 42, the filter tube 52 is generally cylindrical in shape. The filter tube 52 has an inner passage 56 which receives flow from the inlet 48. Flow through inner passage 56 is controlled by a control valve (not seen) connected to vessel outlet 58. When flow is allowed through vessel outlet 58 by the opening of the control valve, water flowing through inner passage 54 will pass through the screen openings of the filter tube 52, which extend from the inner passage to the exterior of the filter tube, into annulus 54 and the dirty water discharged through vessel outlet 58. Various means may be utilized to control back pressure, including a control valve, orifice plate or piping design, causing flow through inner passage 56 to be discharged through nozzle 60 which discharges into vessel 12. The nozzle 60, comprises a conical tube 63 and an orifice 61 which may be utilized to control backpressure and to reduce the pressure to which the separator is subjected during the backwash cycle, particularly high transient pressures which occur when the backwash pump initially comes on. As shown in FIG. 1, the scrubber tube 42 has an enclosed top 44 and bottom 46, a scrubber tube inlet 48 at the top for receiving flow from the pump discharge, a scrubber tube outlet 50 in a sidewall of the scrubber tube, and a scrubber tube opening at the bottom 46 through which a nozzle 60 extends so flow is discharged outside of the scrubber tube 42. The filter tube 52 includes a conical tube having an upper end and a lower end, wherein the upper end of the conical tube has an outer diameter that is larger than an outer diameter of the lower end of the conical tube, wherein the upper end of the conical tube is connected to a lower end of the filter tube 52 and a lower end of the conical tube is hydraulically connected to the nozzle 60. The nozzle 60 includes a flow restricting orifice that is hydraulically connected to the inner passage 56 of the filter tube 52 via the conical tube, wherein the flow restricting orifice reduces a pressure to which the vessel is subjected during a backwash cycle and discharges filter material and water into the vessel 12.

As with the apparatus disclosed in the '464 patent, the scrubbing cycle preferably is achieved by disposing the suction 38 and discharge 40 of pump 36 within the upper end 14 of the vessel 12. However, instead of being directed towards a circulation guide means as taught in the '464 patent, the pump 36 discharges into the inside of the backwash filter tube 52. As with the apparatus disclosed in the '464 patent, pump suction 38 takes liquid from the upper end 14 of the vessel 12. As backwash water is discharged from the nozzle 60 located at the bottom of the backwash filter tube 52, the backwash water is directed towards the bottom of the filter vessel 12. This action sets up a desirable flow pattern wherein the filter media 24 becomes intimately admixed with the liquid contained within the vessel 12 and great agitation of the individual particles of the media achieves an unusually efficient cleaning and scrubbing action. As with the '464 apparatus, the flow at this time follows a geometrical flow path which is in the form of a toroid having a central vortex which coincides with the axial centerline of the filter vessel 12, with the outer upward flowing part of the vortex being confined by the inner peripheral wall surface of the vessel.

Figures 4, 5:
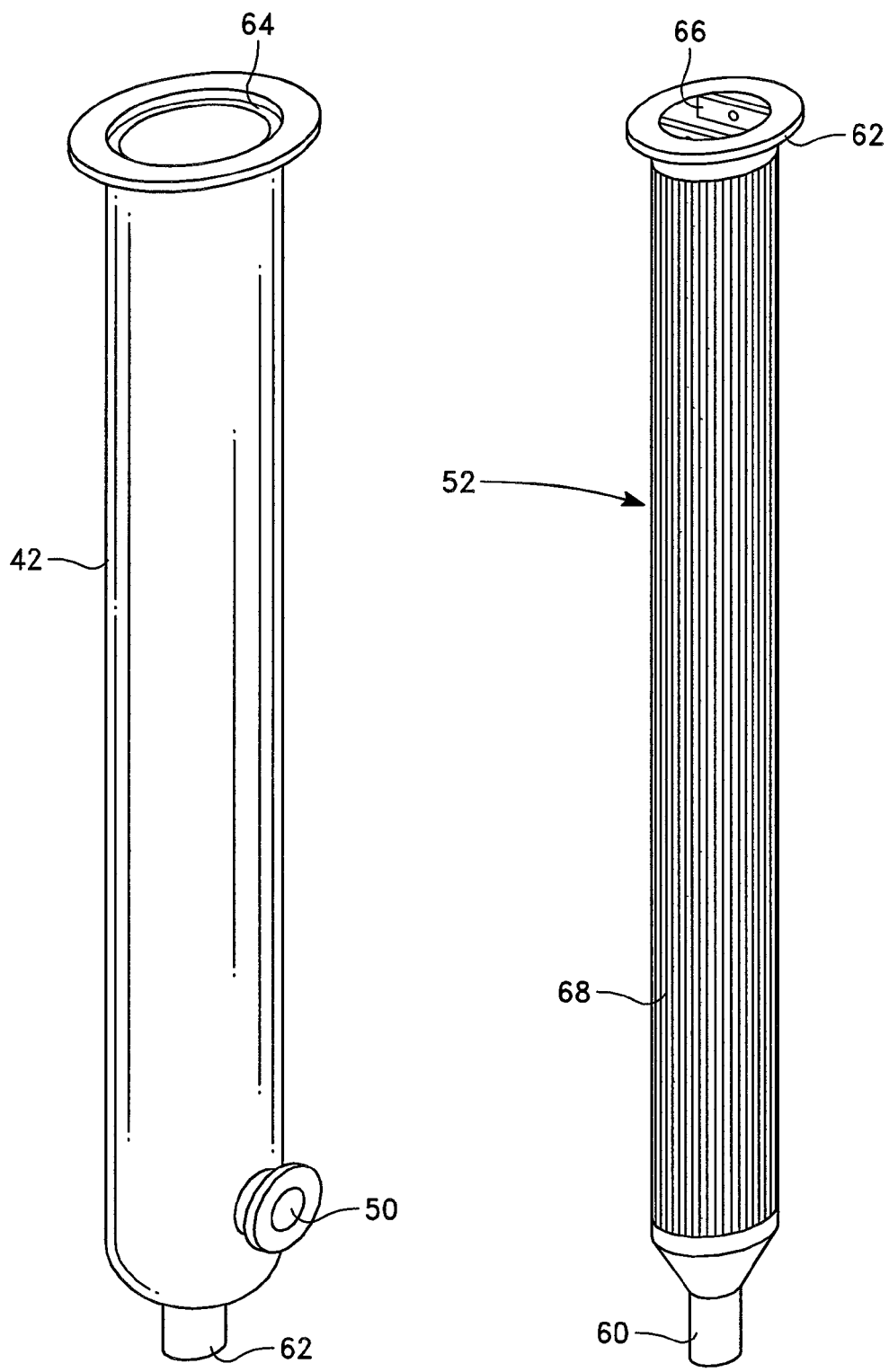
FIG. 4 shows side view of an embodiment of a scrubber tube.
FIG. 5 shows a backwash filter tube which is utilized with the scrubber tube depicted in FIG. 4.
Figure 6:
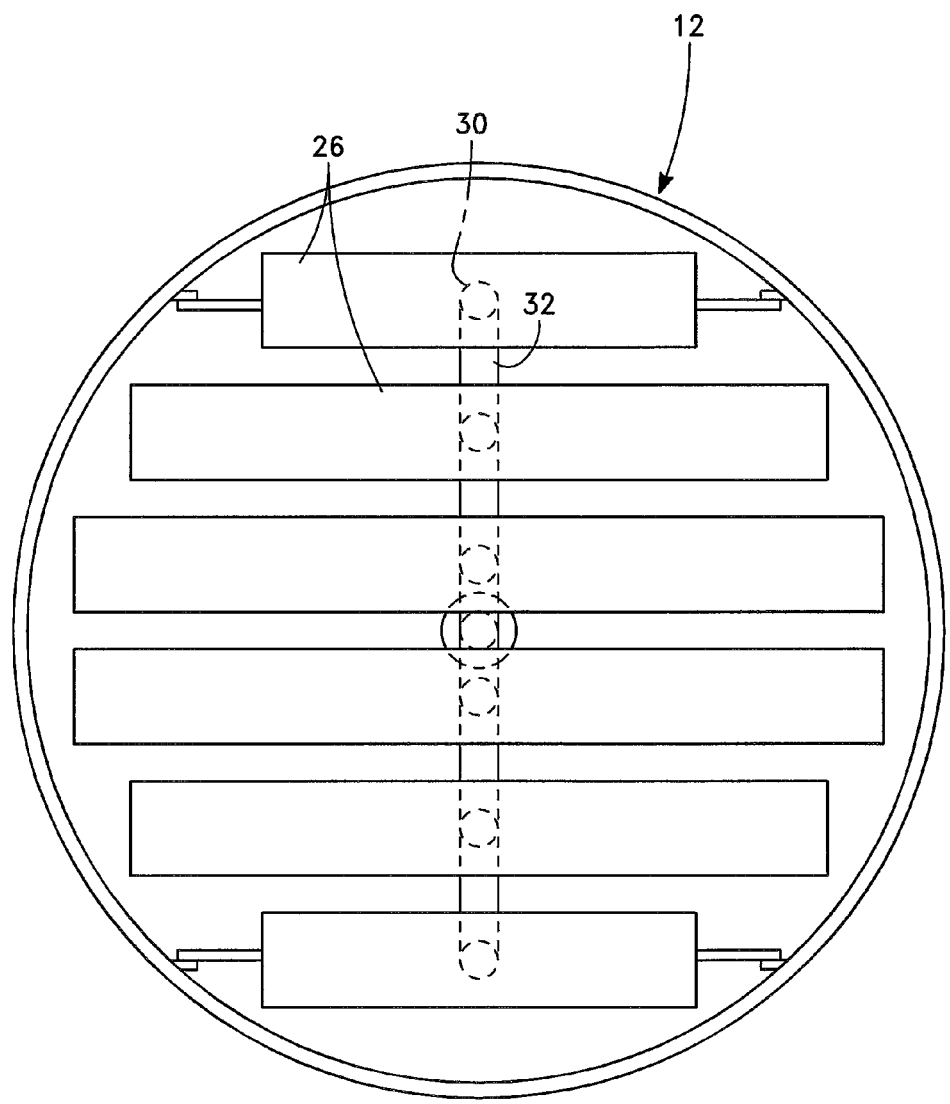
FIG. 6 shows a top view of an embodiment of lateral screens which are disposed in the lower end of the filter vessel.

FIGS. 4 and 5 depict the scrubber tube 42 and filter tube 52, with the filter tube removed from the scrubber tube. It is to be noted that scrubber tube 42 comprises a bottom outlet 62 through which nozzle 60 extends. Filter tube 52 may comprise an upper flange 62 which sits within seat 64 of the scrubber tube 42. Filter tube 52 may further comprise lifting tabs 66 which may be utilized for lifting the filter tube from the scrubber tube 42. Filter tube 52 comprises wire screen 68 which, as with lateral screened enclosure 26 is preferably of wedge wire construction. Wedge wire screen utilized for wire screen 68 should have slot widths of approximately 20 thousands of an inch.

Figure 3:
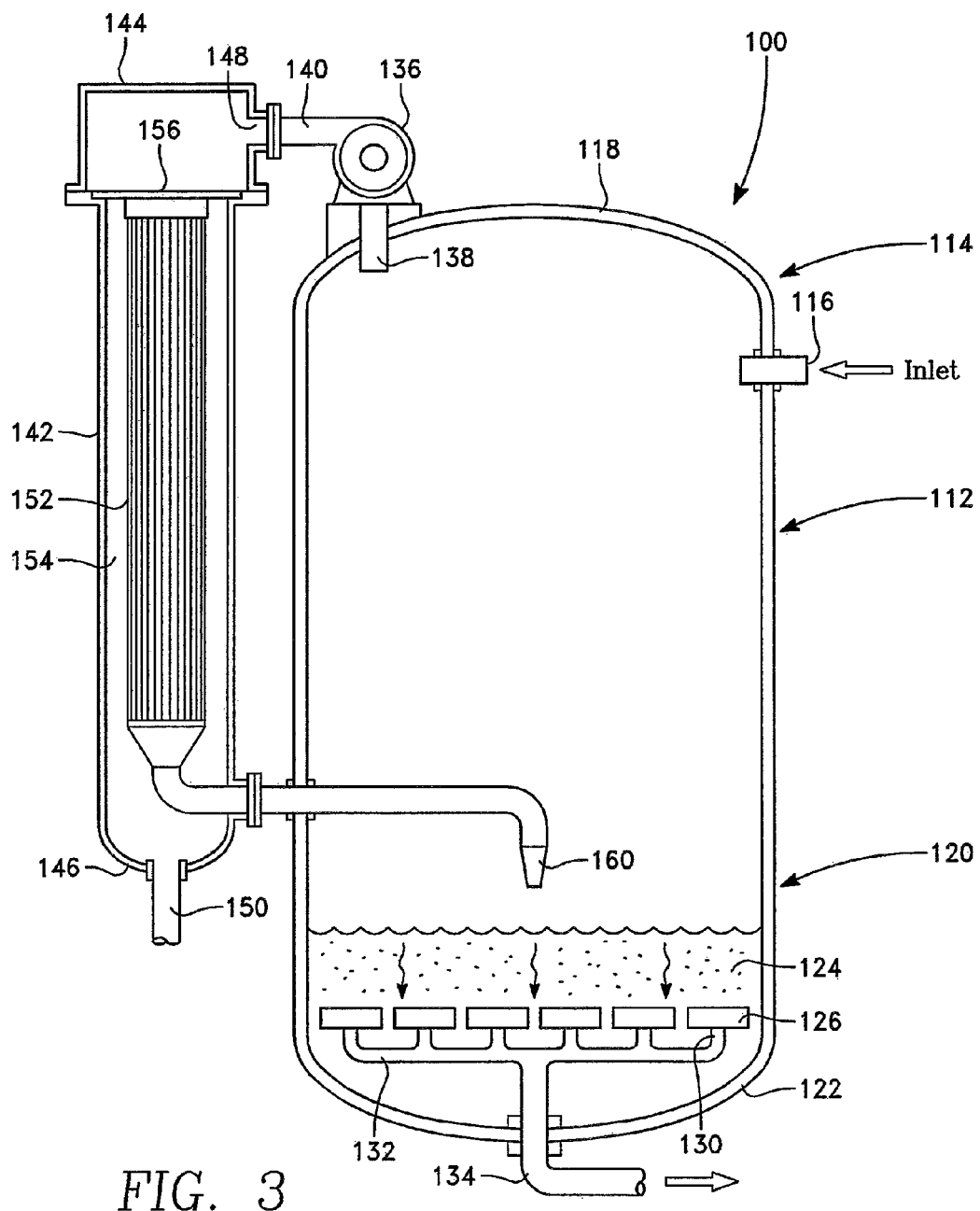
FIG. 3 shows a second embodiment of the disclosed filter system in the filtering mode, showing how the scrubber tube may be disposed outside of the main filter vessel.

FIG. 3 depicts an alternative embodiment of the disclosed filtering system 100. The alternative embodiment of the system comprises a filter vessel 112. The filter vessel 112 has an upper end 114, which generally extends from inlet 116 to the enclosed top 118 of the vessel. Contaminated liquid flows into the filter vessel 112 through inlet 116. The filter vessel 112 has a lower end 120 which generally comprises about the lower axial third of the vessel to the enclosed bottom 122 of the vessel. The filter vessel 112 is adapted to hold a quantity of particulate filter material 124. As with the embodiment discussed above, the filter material 124 may comprise various nutshell or other organic materials, including walnut shells, pecan shells, coconut shells, peach pits, apricot pits, and olive seeds.

The disclosed filtering system 100 has at least one lateral screened enclosure 126 supported within the lower end 120 of the vessel 112. As shown in the Figures, the disclosed filtering system may have a plurality of lateral screen enclosures 126 which are placed within the vessel at the lower end 120 at approximately the same axial position within the vessel 112. Each lateral screened enclosure 126 may comprise an outlet 130 through which filtered liquid can exit the enclosure into a header 32. Outlets 130 may be piped together to header 132 for discharge out of vessel 112 through vessel outlet 134.

The disclosed apparatus further comprises a scrubber apparatus connected to the side of vessel 112. The scrubber apparatus provides the means for cleaning the filter material 124 to remove the matter deposited by the water passing through the filter material. The scrubber apparatus comprises some form of pump means, such as pump 136, which provides for circulation of scrub water through the vessel, allowing for the cleaning of the filter material 124. Pump 136 has a suction 138 and a discharge 140. The scrubber apparatus further comprises a scrubber tube 142 which has an enclosed top 144 and an enclosed bottom 146. Scrubber tube 142 is generally a cylindrical in shape. Scrubber tube 142 has an inlet 148 generally located at the top of the scrubber tube, where flow from the pump discharge 140 is received. Toward the bottom end of the scrubber tube 142 is an outlet 150 through which flow is discharged from the scrubber tube.

The scrubber apparatus further comprises a filter tube 152 which is contained within the scrubber tube 142. An annulus 154 is defined between the scrubber tube 142 and the filter tube 152. As with the scrubber tube 142, the filter tube 152 is generally cylindrical in shape. The filter tube 152 has an inner passage 156 which receives flow from the inlet 148. Flow through inner passage 156 is controlled by pressure control means (not shown) such as a control valve, orifice plate or piping design connected to outlet 150. When flow is allowed through outlet 150 by the opening of the control valve, water flowing through inner passage 154 will pass through the screen openings of the filter tube 152, which extend from the inner passage to the exterior of the filter tube, into annulus 154 and the dirty water discharged through outlet 150. The control valve, orifice plate, or other back pressure control means may be manipulated to apply back pressure and cause flow through inner passage 156 to be discharged through nozzle 160 which discharges into vessel 112. The nozzle 160 comprises an orifice 161 which may be utilized to control backpressure and to reduce the pressure to which the separator is subjected during the backwash cycle, particularly high transient pressures which occur when the backwash pump initially comes on. Scrubbing of the filter material 124 for this embodiment of the filtering system 100 accomplished in a similar fashion as that discussed for the embodiment of the filtering system 10 discussed above. As shown in FIG. 3, the scrubber tube 142 includes an enclosed top 144 and an enclosed bottom 146, a scrubber tube inlet 148 at the top for receiving flow, a first scrubber tube outlet 150 in a bottom of the scrubber tube, and a second scrubber tube outlet in a sidewall of the scrubber tube, wherein the second scrubber tube outlet is hydraulically connected to an inlet of a nozzle 160 located within the vessel 112 via a connecting pipe. The filter tube 152 includes a conical tube having an upper end and a lower end, wherein the upper end of the conical tube has an outer diameter that is larger than an outer diameter of the lower end of the conical tube, and wherein the upper end of the conical tube is connected to a lower end of the filter tube 152 and a lower end of the conical tube is connected to the second scrubber tube outlet. The nozzle 160 includes a flow restricting orifice hydraulically connected to the inner passage 156 of the filter tube 152 via the conical tube, the second scrubber tube outlet, and the connecting pipe, wherein the flow restricting orifice reduces a pressure to which the vessel is subjected during a cleaning cycle.

While the above is a description of various embodiments of the present invention, further modifications may be employed without departing from the spirit and scope of the present invention. For example, the size, shape, and/or material of the various components may be changed as desired. Thus the scope of the invention should not be limited by the specific structures disclosed. Instead the true scope of the invention should be determined by the following appended claims.

What is claimed is:

1. A filter system for removing contaminants from a liquid flowing through the system where the system comprises:
   a vessel having an upper end, a lower end, and an inlet in the upper end for receiving a contaminated liquid flow, said vessel adapted to hold a quantity of particulate filter material therein; at least one lateral screened enclosure supported within the vessel at the lower end, the lateral screened enclosure comprising an outlet through which filtered liquid can exit the vessel;
   a scrubber apparatus connected to said vessel by which the filter material can be cleaned, wherein said scrubber apparatus comprises: (i) a pump having a suction and a discharge; (ii) a scrubber tube located inside the vessel, the scrubber tube having an enclosed top and bottom, a scrubber tube inlet at the top for receiving flow from the pump discharge, a scrubber tube outlet in a sidewall of the scrubber tube, and a scrubber tube opening at the bottom through which a nozzle extends so flow is discharged outside of the scrubber tube; (iii) a filter tube having a screened wall construction contained within the scrubber tube, wherein an annulus is defined between the scrubber tube and the filter tube, wherein said filter tube comprises an inner passage which receives a flow of filter material and contaminants suspended in water from the scrubber tube inlet, a conical tube having an upper end and a lower end, wherein the upper end of the conical tube has an outer diameter that is larger than an outer diameter of the lower end of the conical tube, wherein the upper end of the conical tube is connected to a lower end of the filter tube and a lower end of the conical tube is hydraulically connected to the nozzle, the nozzle comprising a flow restricting orifice that is hydraulically connected to the inner passage of the filter tube via the conical tube, wherein the flow restricting orifice reduces a pressure to which the vessel is subjected during a backwash cycle and discharges filter material and water into the vessel, wherein flow of contaminants and water through the inner passage may pass through the screen wall into the annulus for discharge through the scrubber tube outlet and flow of filter material and water may pass through the nozzle for discharge into the vessel; and
   said pump suction connected to receive flow of filter material and contaminants suspended in water from the interior of said vessel and exiting the pump discharge, wherein said flow is directed to flow through the inner passage, and filter material suspended in water pass through the orifice of the nozzle, causing the liquid and particulate filter material within the vessel to assume a flow path which scrubs the filter material inside the vessel.

2. The filter system of claim 1 wherein the scrubber tube and filter tube are generally cylindrical.

3. The filter system of claim 1 comprising a plurality of lateral screened enclosures, wherein the enclosures are disposed at the same axial position within the vessel.

4. The filter system of claim 3 wherein each lateral screened enclosure comprises an outlet connection.

5. The filter system of claim 1 wherein the lateral screened enclosure comprises a top having a wedge wire construction.

6. The filter system of claim 1 wherein the lateral screened enclosure comprises solid sides and a solid bottom.

7. The filter system of claim 1 wherein the filter tube comprises a wedge wire construction.

8. A filter system for removing contaminants from a liquid flowing through the system where the system comprises:
   a vessel having an upper end, a lower end, and an inlet in the upper end for receiving a contaminated liquid flow, said vessel adapted to hold a quantity of particulate filter material therein;
   at least one lateral screened enclosure supported within the vessel at the lower end, the at least one lateral screened enclosure comprising an outlet through which filtered liquid can exit the enclosure, wherein the outlet is connected to a common header connected to a vessel outlet through which filtered liquid can exit the vessel;
   a scrubber apparatus connected to said vessel by which the particulate filter material can be cleaned, wherein said scrubber apparatus comprises: (i) a pump having a suction and a discharge; (ii) a scrubber tube disposed outside the vessel, the scrubber tube having an enclosed top and bottom, a scrubber tube inlet at the top for receiving flow from the pump discharge, a first scrubber tube outlet in a bottom of the scrubber tube, and a second scrubber tube outlet in a sidewall of the scrubber tube, wherein the second scrubber tube outlet is hydraulically connected to an inlet of a nozzle located within the vessel via a connecting pipe; (iii) a filter tube comprising a screened wall construction contained within the scrubber tube, wherein an annulus is defined between the scrubber tube and the filter tube, wherein said filter tube comprises an inner passage which receives flow of filter material and contaminants suspended in water from the scrubber tube inlet, a conical tube having an upper end and a lower end, wherein the upper end of the conical tube has an outer diameter that is larger than an outer diameter of the lower end of the conical tube, wherein the upper end of the conical tube is connected to a lower end of the filter tube and a lower end of the conical tube is connected to the second scrubber tube outlet, the nozzle comprising a flow restricting orifice hydraulically connected to the inner passage of the filter tube via the conical tube, the second scrubber tube outlet, and the connecting pipe, wherein the flow restricting orifice reduces a pressure to which the vessel is subjected during a backwash cycle, and wherein the flow of contaminants and water through the inner passage may pass through the screened wall into the annulus for discharge through the first scrubber tube outlet and flow of filter material and water may pass through the orifice of the nozzle for discharge into the vessel; and
   said pump suction connected to receive flow of liquid from the interior of said vessel, said flow of liquid exiting the pump discharge, wherein said flow of liquid may be selectively directed to flow through the inner passage, pass through the nozzle, causing the liquid and particulate filter material within the vessel to assume a flow path which scrubs the filter material.

9. The filter system of claim 8 wherein the scrubber tube and filter tube are generally cylindrical.

10. The filter system of claim 8 wherein the lateral screened enclosures are disposed at the same axial position within the vessel.

11. The filter system of claim 10 wherein each of the lateral screened enclosures comprises a top having a wedge wire construction.

12. The filter system of claim 11 wherein the lateral screened enclosures are connected to a single common header connected to the vessel outlet.

13. The filter system of claim 12 wherein the vessel outlet discharges through the bottom of the vessel.

14. The filter system of claim 8 wherein each of the lateral screened enclosures comprises solid sides and a solid bottom.

15. A filter system for removing contaminants from a liquid flowing through the system where the system comprises:
   a vessel having an upper end, a lower end, and an inlet in the upper end for receiving a contaminated liquid flow, said vessel adapted to hold a quantity of particulate filter material therein;
   a scrubber apparatus connected to said vessel by which the particulate filter material can be cleaned in periodic cleaning cycles, wherein said scrubber apparatus comprises a scrubber tube outside of the vessel, the scrubber tube comprising an enclosed top and bottom, a scrubber tube inlet at the top for receiving flow, a first scrubber tube outlet in a bottom of the scrubber tube, and a second scrubber tube outlet in a sidewall of the scrubber tube, wherein the second scrubber tube outlet is hydraulically connected to an inlet of a nozzle located within the vessel via a connecting pipe; and a filter tube enclosed within the scrubber tube, wherein said filter tube comprises an inner passage which receives a flow of filter material and contaminants suspended in water from the scrubber tube inlet, a conical tube having an upper end and a lower end, wherein the upper end of the conical tube has an outer diameter that is larger than an outer diameter of the lower end of the conical tube, wherein the upper end of the conical tube is connected to a lower end of the filter tube and a lower end of the conical tube is connected to the second scrubber tube outlet, the nozzle comprising a flow restricting orifice hydraulically connected to the inner passage of the filter tube via the conical tube, the second scrubber tube outlet, and the connecting pipe, wherein the flow restricting orifice reduces a pressure to which the vessel is subjected during a cleaning cycle, a pump having a suction and a discharge, wherein during said cleaning cycles, the pump suction receives flow of liquid from the interior of said vessel, wherein at the initiation of said cleaning cycles, said flow of liquid is discharged into said inner passage of the filter tube at a first pressure and said flow of liquid is discharged through the orifice of the nozzle into the vessel at a second pressure causing the liquids and particulate filter material within the vessel to assume a flow path which scrubs the filter material, wherein the second pressure is substantially less than the first pressure at the initiation of said cleaning cycles.

\* \* \* \* \*